United States Patent [19]

Berner et al.

[11] Patent Number: 4,560,709

[45] Date of Patent: Dec. 24, 1985

[54] PHOTOPOLYMERIZABLE MIXTURES AND PROCESSES FOR THE PHOTOPOLYMERIZATION OF CATIONICALLY POLYMERIZABLE COMPOUNDS

[75] Inventors: Godwin Berner, Rheinfelden; Rudolf Kirchmayr, Aesch, both of Switzerland

[73] Assignee: Ciba Geigy Corporation, Ardsley, N.Y.

[21] Appl. No.: 526,516

[22] Filed: Aug. 26, 1983

Related U.S. Application Data

[63] Continuation of Ser. No. 419,120, Sep. 16, 1982, abandoned, which is a continuation of Ser. No. 261,424, May 8, 1981, abandoned, which is a continuation-in-part of Ser. No. 236,464, Feb. 20, 1981, abandoned.

[30] Foreign Application Priority Data

Feb. 29, 1980 [CH] Switzerland .................. 1628/80

[51] Int. Cl.⁴ .......................... C08F 2/50; C08J 3/28; C08G 59/68; C08G 59/72
[52] U.S. Cl. .................. 204/159.14; 528/89; 528/91; 528/92; 204/159.11
[58] Field of Search ............ 204/159.23, 159.24

[56] References Cited

U.S. PATENT DOCUMENTS

| | | | |
|---|---|---|---|
| 3,708,296 | 1/1973 | Schlessinger | 204/159.23 |
| 4,026,705 | 5/1977 | Crivello | 430/280 |
| 4,156,035 | 5/1979 | Tsao et al. | 204/159.11 |
| 4,156,046 | 5/1979 | Lien et al. | 428/220 |
| 4,193,799 | 3/1980 | Crivello | 204/159.18 |
| 4,219,377 | 8/1980 | Albrecht | 204/159.11 |
| 4,250,203 | 2/1981 | Schlessinger et al. | 204/159.11 |
| 4,284,485 | 8/1981 | Berner | 204/159.24 |
| 4,321,118 | 3/1982 | Felder et al. | 204/159.23 |
| 4,336,366 | 6/1982 | Berner et al. | 204/159.23 |
| 4,351,708 | 9/1982 | Berner et al. | 204/159.23 |
| 4,428,807 | 1/1984 | Lee et al. | 204/159.23 |

FOREIGN PATENT DOCUMENTS 3002 12/1978 European Pat. Off. .
1491539 11/1977 United Kingdom .

OTHER PUBLICATIONS

F. A. M. Abdul-Rasoul et al, Polymer, 1978, 1219.

Primary Examiner—John C. Bleutge
Assistant Examiner—Arthur H. Koeckept
Attorney, Agent, or Firm—Luther A. R. Hall

[57] ABSTRACT

Cationically polymerizable compounds, for example epoxide compounds, can be polymerized photochemically using a catalyst combination consisting of an aromatic iodonium salt and a ketone of the formula I, II or III

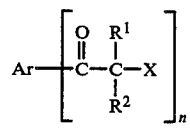

I

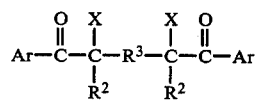

II

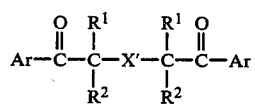

III in which n is 1 or 2 and Ar, X, X', $R^1$, $R^2$ and $R^3$ are as defined in claim 1. In this combination, the ketones act as a co-catalyst and drastically accelerate the photopolymerization, although they are not able to initiate a cationic photopolymerization on their own.

9 Claims, No Drawings

PHOTOPOLYMERIZABLE MIXTURES AND PROCESSES FOR THE PHOTOPOLYMERIZATION OF CATIONICALLY POLYMERIZABLE COMPOUNDS

This is a continuation of application Ser. No. 419,120, dated Sept. 16, 1982, now abandoned, which in turn is a continuation of application Ser. No. 261,424, filed May 8, 1981, now abandoned, which in turn is a continuation-in-part of application Ser. No. 236,464, filed Feb. 20, 1981, now abandoned.

The invention relates to photopolymerisable mixtures of cationically polymerisable compounds and a specific catalyst combination and to the corresponding process for the photopolymerisation of cationically polymerisable compounds with the aid of such catalyst combinations.

In general, cationically polymerisable compounds cannot be polymerised by irradiation with short-wave light. Only on the addition of those catalysts which split off Lewis acids on irradiation with UV light and which act as cationic polymerisation initiators can cationically polymerisable compounds also be polymerised photochemically. Known examples of such photocatalysts are the tetrafluoborates, hexafluorophosphates or similar complex salts of aromatic diazonium cations (U.S. Pat. No. 3,708,296), of aromatic sulfonium cations (U.S. Pat. No. 4,058,401) or of aromatic halonium, in particular iodonium, cations (German Offenlegungsschrift No. 2,518,639). On irradiation with UV light, complex salts of this type split off $BF_3$, $PF_5$ or similar Lewis acids, which act as cationic polymerisation initiators.

The industrial significance of such photochemical polymerisations is, in particular, in those fields of application where the substrate to be polymerised is in a thin layer, for example when curing lacquers, coatings or printing inks by UV radiation. Photochemical polymerisation processes are not very suitable for substrates in a thick layer, since the short-wave radiation is absorbed by the uppermost layer of the substrate and the lower layer remains uncured.

F. Abdul-Rasoul, A. Ledith and Y. Yagci have already indicated, in Polymer 1978, 1219, that the photopolymerisation of cationically polymerisable compounds, for example tetrahydrofuran or butyl vinyl ether, in a thick layer (bulk) proceeds immeasurably slowly in the presence of aromatic diazonium, sulfonium or iodonium salts, but can be considerably accelerated by the addition of specific carbonyl compounds as co-catalysts. Suitable co-catalysts are those compounds which are known as free radical photoinitiators, for example benzophenone, benzoin ethyl ether, benzil, benzil dimethyl ketal, diethoxyacetophenone or tert.-butyl anthraquinone. The conversions achieved with such catalyst combinations in the case of the photopolymerisation of tetrahydrofuran are up to 13.4% with irradiation times of 45–180 minutes. The formation of a gel from a bis-epoxide by UV irradiation in the presence of an iodonium salt on its own required an irradiation time of 84 minutes, and still required 10 minutes when benzil dimethyl ketal was added as the co-catalyst. These are irradiation times which are still too long for industrial processes.

It has now been found that the rate of polymerisation can be further considerably increased if specific aromatic-aliphatic ketones are used as the co-catalyst.

The invention relates to photopolymerisable mixtures containing (a) one or more cationically polymerisable compounds, (b) an aromatic iodonium salt as the polymerisation catalyst, (c) an aromatic carbonyl compound as the co-catalyst and (d), if desired, further additives, wherein component (c) is a ketone of the formula I, II or III

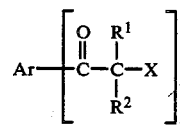 I

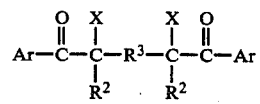 II

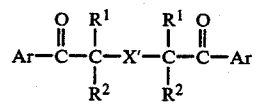 III in which n is 1 or 2, Ar, in formula I, if n is 1, and in formulae II and III is aryl having 6–14 C atoms, tetrahydronaphthyl, thienyl, pyridyl, furyl or phenyl which is substituted by one or more of the radicals F, Cl, Br, CN, OH, $C_1$-$C_{12}$-alkyl, —OAlk, —O—phenyl, —SAlk, —S—phenyl, —$SO_2$—phenyl, —COOAlk, and Alk is a lower alkyl radical having 1–4 C atoms, and Ar in formula I, if n is 2, is $C_6$-$C_{12}$ arylene or a -phenylene-T-phenylene- group, X is one of the groups —$OR^4$ or —$OSiR^5(R^6)_2$, or together with $R^1$ is a —O—CH($R^7$)— group, X' is one of the groups —O—$R^8$—O—, —O—$SiR^5R^6$—O— or —O—$SiR^5R^6$—O—$SiR^5R^6$—O—, T is —O—, —S—, —$SO_2$— or —$CH_2$—, $R^1$ is $C_1$-$C_8$ alkyl, which is unsubstituted or substituted by —OH, —OAlk, $C_2$-$C_8$ acyloxy, —COOAlk or —CN, or $C_3$-$C_4$ alkenyl, $C_5$-$C_6$-cycloalkyl or $C_7$-$C_9$ phenylalkyl, $R^2$ has one of the meanings defined for $R^1$ or is a —$CH_2CH_2R^9$ group, or together with $R^1$ is $C_2$-$C_8$ alkylene or $C_3$-$C_9$ oxa- or aza-alkylene, $R^3$ is a direct bond, $C_1$-$C_6$ alkylene, phenylene, diphenylene or a -phenylene-T-phenylene group, or together with the two $R^2$ substituents and the two C atoms to which these substituents are bonded, forms a cyclopentane or cyclohexane ring, $R^4$ is hydrogen, $C_1$-$C_{12}$ alkyl, $C_2$-$C_6$ alkyl which is substituted by OH, OAlk or CN, or $C_3$-$C_5$ alkenyl, cyclohexyl, benzyl, unsubstituted phenyl or phenyl substituted by Cl or Alk, or 2-tetrahydropyranyl, $R^5$ and $R^6$ are identical or different and are $C_1$-$C_4$ alkyl or phenyl, $R^7$ is hydrogen, $C_1$-$C_8$ alkyl or phenyl, $R^8$ is $C_2$-$C_8$ alkylene, $C_4$-$C_6$ alkenylene or xylylene and $R^9$ is —$CONH_2$, —CONHAlk, —CON(Alk)$_2$, —P(O)(OAlk)$_2$ or 2-pyridyl.

The invention also relates to a process for the photochemical polymerisation of cationically polymerisable compounds or mixtures of compounds by irradiation with short-wave light in the presence of an aromatic iodonium salt as the catalyst and also in the presence of a ketone of the formula I, II or III defined above, as the co-catalyst, and, if desired, further additives.

Compounds cationically polymerisable according to the invention are O- or S-containing saturated heterocyclic compounds, in particular those having 3, 4 or 5 ring members, and their derivatives. Examples are oxiranes, such as ethylene oxide, propylene oxide, epichlorohydrin, styrene oxide, phenyl glycidyl ether or butyl glycidyl ether; oxetanes, such as trimethylene oxide, 3,3-dimethyloxetane or 3,3-di-(chloromethyl)oxetane; oxolanes, such as tetrahydrofuran or 2,3-dimethyltetrahydrofuran; cyclic acetals, such as trioxan, 1,3-dioxolane or 1,3,6-trioxacyclooctane; cyclic lactones, such as β-propiolactone, ε-caprolactone and the alkyl derivatives thereof; thiiranes, such as ethylene sulfide, 1,2-propylene sulfide or thioepichlorohydrin; and thietanes, such as 1,3-propylene sulfide or 3,3-dimethylthietane.

Further compounds polymerisable according to the invention are those ethylenically unsaturated compounds which are polymerisable by a cationic mechanism. Such compounds include mono- and di-olefins, for example isobutylene, 1-octene, butadiene and isoprene; styrene, allylbenzene or vinylcyclohexane; vinyl ethers, such as vinyl methyl ether, vinyl isobutyl ether or ethylene glycol divinyl ether; vinyl esters, such as vinyl acetate or vinyl stearate; N-vinyl compounds, such as N-vinylpyrrolidone or N-vinylcarbazole, and dihydropyran derivatives, for example the 3,4-dihydro-2H-pyran-2-carboxylic acid esters of 2-hydroxymethyl-3,4-dihydro-2H-pyran.

Further compounds polymerisable according to the invention are the prepolymers of phenol-formaldehyde resins, urea-formaldehyde resins or melamine-formaldehyde resins and similar aminoplasts, and also mixtures of such aminoplasts with acrylic resins, alkyd resins or polyester resins containing functional groups. Further compounds polymerisable according to the invention are N-methylol derivatives of polycarboxylic acid amides, for example of polyacrylamide.

Compounds of particular importance amongst these polymerisable compounds which have been listed are the epoxide compounds, in particular the di- and poly-epoxides and epoxide resin prepolymers, such as are used for the preparation of epoxide resins. This is customarily effected by chemical curing with amines, phenols, dicarboxylic acid anhydrides and the like, either at room temperature or with heating. If the catalyst combinations according to the invention are used, the epoxides can be cured photochemically without the addition of chemical reactants, i.e. a one-component system can be used.

The di- and poly-epoxides used for this purpose can be aliphatic, cycloaliphatic or aromatic compounds. Examples are the glycidyl ethers of aliphatic or cycloaliphatic diols or polyols, for example those of ethylene glycol, propane-1,2-diol, propane-1,3-diol, butane-1,4-diol, diethylene glycol, glycerol, trimethylolpropane or 1,4-dimethylol-cyclohexane or of 2,2-bis-(4-hydroxycyclohexyl)-propane, and the glycidyl ethers of di- and polyphenols, for example of resorcinol, 4,4'-dihydroxydiphenylmethane, 2,2-di-(4-hydroxyphenyl)-propane or novolacs. Further examples are the N-glycidyl compounds, for example the diglycidyl compounds of ethyleneurea, 1,3-propyleneurea or 5-dimethylhydantoin or of 4,4'-methylene-5,5'-tetramethyldihydantoin, or such as triglycidyl isocyanurate.

Further glycidyl compounds of industrial importance are the glycidyl esters of carboxylic acids, in particular of di- and poly-carboxylic acids. Examples are the glycidyl esters of adipic acid, phthalic acid, terephthalic acid, tetra- or hexa-hydrophthalic acid or isophthalic acid or of trimellitic acid.

Examples of polyepoxides, which are not glycidyl compounds, are the diepoxides of vinylcyclohexene or dicyclopentadiene, 3-(3',4'-epoxycyclohexyl)-8,9-epoxy-2,4-dioxaspiro[5.5]undecane or 3',4'-epoxycyclohexylmethyl 3,4-epoxycyclohexanecarboxylate, butadiene diepoxide or isoprene diepoxide, epoxidised linoleic acid derivatives or epoxidised polybutadiene.

Furthermore, it is also possible to use ethylenically unsaturated epoxide compounds which are able to react polyfunctionally under the conditions according to the invention and thus are capable of forming crosslinked resins. Examples of such compounds are allyl glycidyl ether, glycidyl acrylate or glycidyl methacrylate or unsaturated polyepoxides such as partially (meth)acrylated epoxide resins.

The epoxide compounds can be used in mixtures with one another or also in mixtures with other cationically polymerisable compounds, for example in order to modify the physical properties of the resins obtainable therefrom. Of special importance are mixtures of polyglycidylether type epoxide resins with epoxidised soybean oils, as such mixtures after curing show a high flexibility and elasticity. The mixtures according to the invention can also contain, as additives, hydroxyl-containing compounds such as are described in German Offenlegungsschrift No. 2,639,395. The epoxide compounds can also be pre-cured by chemical means, for example by reaction with diols or dicarboxylic acid anhydrides.

Compared with the use of the di- and poly-epoxides, the use of such prepolymers for the production of articles from epoxide resins can have certain advantages, for example more simple storage and handling, more rapid processing to shaped articles and the possibility for incorporating additives such as glass fibres or pigments into the prepolymers, for example during the preparation of prepregs.

Prepolymers of this type can also be prepared by thermally-initiated polymerisation, if an agent which forms free radicals on heating is added, as a second co-catalyst, to the mixtures to be polymerised. Examples of suitable agents which form free radicals on heating are organic peroxy compounds or azo compounds, but in particular dibenzyl derivatives such as benzpinacol and its derivatives.

The aromatic iodonium salts which can be used according to the invention are known compounds, which are known to be able to initiate cationic reactions when they are irradiated with short-wave light. The use of such iodonium salts as photoinitiators for cationic polymerisations has been disclosed, for example, in German Offenlegungsschrift No. 2,518,639 or in German Offenlegungsschrift No. 2,520,489. These salts can be prepared, for example, by one of the methods listed in the Journal of Amer. Chem. Soc. 75, 2705 (1953) and 81, 342 (1959). The anions of these iodonium salts are complex halide anions, for example $BF_4^-$, $PF_6^-$, $SbCl_6^-$, $AsF_6^-$, $SnCl_5^-$ or $BiF_6^-$.

Preferred iodonium salts are those of the formula IV

$$[Ar^1-I-Ar^2]^+ \ [MQ_n]^- \qquad \text{IV}$$

in which $Ar^1$ and $Ar^2$ independently of one another are phenyl, naphthyl or phenyl which is substituted by one or more of the radicals $C_1$–$C_8$-alkyl, phenyl, phenoxy, halogen, nitro or $C_1$–$C_4$-alkoxy, or $Ar^1$ and $Ar^2$ together are a divalent radical of the formula V

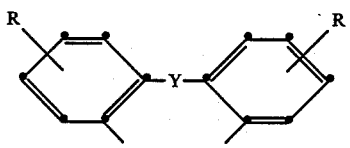

in which Y is a direct bond, —O—, —CH$_2$— or —CO— and R is C$_1$-C$_4$-alkyl, halogen, nitro or C$_1$-C$_4$-alkoxy, M is a metal atom or metalliod atom from the series comprising B, P, As, Sb, Sn, Bi and Fe, Q is fluorine or chlorine and n is 4, 5 or 6 and 1 larger than the valency of M.

Diphenyliodonium salts and iodonium salts in which the anion [MQ$_n$]$^-$ is one of the anions BF$_4^-$, PF$_6^-$ or SbF$_6^-$ are particularly preferred.

Examples of individual compounds of the formula IV are: diphenyliodonium tetrafluoborate, di-(p-tolyl)-iodonium pentafluorostannate, di-(4-nitrophenyl)-iodonium hexafluorophosphate, di-(4-tert.-butyl-phenyl)-iodonium hexafluorostibiate, di-2-naphthyl-iodonium tetrafluoborate, diphenyliodonium hexafluorophosphate, di-(4-diphenylyl)-iodonium hexafluoroarsenate, di-(3-methoxyphenyl)-iodonium hexachlorostibiate, phenyl-naphthyl-iodonium tetrafluoborate, phenyl-4-fluorophenyl-iodonium hexafluorophosphate, phenyl-(2-chloro-4-nitrophenyl)-iodonium hexachlorostibiate, phenyl-(3,5-diisopropylphenyl)-iodonium tetrafluoborate, diphenyl-2,2'-diyl-iodonium hexafluorophosphate, diphenylmethane-2,2'-diyl-iodonium hexafluoroarsenate, (diphenyl oxide)-2,2'-diyl-iodonium hexafluorobismuthate, di-(4-nitrophenyl)-methane-2,2'-diyl-iodonium pentafluorostannate, [di-(4-chlorophenyl)oxide]-2,2'-diyl-iodonium tetrafluoborate and 4,4'-dimethoxydiphenyl-2,2'-diyl-iodonium hexafluorophosphate.

The ketones of the formula I, II or III which can be used as co-catalysts are known compounds. In German Offenlegungsschrift No. 2,722,264 and in EP Publication No. 3,002 such compounds are described as initiators for the photopolymerisation of unsaturated compounds. On irradiation with short-wave light they form radicals which are able to initiate free radical polymerisation. However, on their own they are not capable of initiating cationic polymerisation reactions. Only the combination with the iodonium salts of component (b) is able to initiate a cationic photopolymerisation.

In formula I, if n is 1, and in the formulae II and III, Ar can be aryl having 6-14 C atoms, for example phenyl, naphthyl, diphenylyl, phenanthryl or anthracenyl. Tetrahydronaphthyl Ar can be 5,6,7,8-tetrahydro-1-naphthyl or -2-naphthyl. Examples of Ar as substituted phenyl are: 4-fluorophenyl, 2,4-dichlorophenyl, 3-cyanophenyl, 2-hydroxyphenyl, 4-tolyl, 3,5-xylenyl, 4-isopropylphenyl, 2-methyl-4-tert.-butyl-phenyl, 3,5-dioctylphenyl, 4-methoxyphenyl, 4-phenoxyphenyl, 4-tert.-butylthiophenyl, 4-phenylthiophenyl, 4-phenylsulfophenyl or 3-ethoxycarbonylphenyl.

Arylene Ar can be phenylene, naphthylene or di-phenylene. Unsubstituted or substituted alkyl R$^1$ and R$^2$ can be, for example, methyl, ethyl, propyl, hexyl, 2-ethylhexyl, hydroxymethyl, 2-ethoxyethyl, 2-acetoxyethyl, 2-(methoxycarbonyl)-ethyl, 2-cyanoethyl or 2-hydroxyethyl.

Alkenyl R$^1$, R$^2$ and R$^4$ can be, for example, allyl or methallyl. Cycloalkyl R$^1$ and R$^2$ can be, for example, cyclopentyl or cyclohexyl. Phenylalkyl R$^1$ and R$^2$ can be, for example, benzyl, phenylethyl or phenylpropyl.

If R$^1$ and R$^2$ together are alkylene or oxa- or aza-alkylene, they form, together with the C atom to which they are bonded, a cycloalkane ring having 3-8 C atoms, for example a cyclopropane, cyclopentane, cyclohexane or cyclooctane ring, or a O- or N-containing ring, for example a tetrahydrofuran, tetrahydropyran or piperidine ring.

Alkylene R$^3$ can be, for example, methylene, di-, tri-, tetra- or hexa-methylene or 2,2-dimethyl-1,3-propylene.

Alkyl R$^4$ can be, for example, methyl, ethyl, butyl, octyl, 2-ethylhexyl or dodecyl.

Substituted alkyl R$^4$ can be, for example, 2-hydroxyethyl, 2-hydroxypropyl, 3-methoxypropyl or 2-butoxyethyl.

Alkyl R$^7$ can be, for example, methyl, ethyl, isopropyl, sec.-butyl, n-hexyl, n-octyl or 2-ethylhexyl.

Alkylene R$^8$ can be, for example, di-, tri-, tetra-, hexa- or octa-methylene or 2,2-dimethyl-1,3-propylene, 1,2-propylene or 1,2-butylene. Alkenylene R$^8$ can be, for example, but-2-en-1,4-ylene or hex-3-en-1,6-ylene.

Compounds of the formula I which are preferred as component (c) of the mixture according to the invention are those in which n is 1 or 2 and Ar, if n is 1, is phenyl, diphenyl, tetrahydronaphthyl or phenyl which is substituted by one or more of the radicals F, Cl, Br, C$_1$-C$_{12}$-alkyl, —O—phenyl or —OAlk and, if n is 2, is C$_6$-C$_{12}$-arylene or a -phenylene-T-phenylene group in which T is —O—, —S— or —CH$_2$—, and Alk is C$_1$-C$_4$-alkyl, X is one of the groups —CR$^4$ or —O-SiR$^5$(R$^6$)$_2$, R$^1$ is C$_1$-C$_8$-alkyl or —CH$_2$CH$_2$COOAlk and R$^2$ is C$_1$-C$_8$-alkyl or allyl, or R$^1$ and R$^2$ together are C$_4$-C$_7$-alkylene, R$^4$ is H, C$_1$-C$_{12}$-alkyl, C$_2$-C$_4$-alkyl which is substituted by —OH, —OAlk or CN, or allyl, benzyl or phenyl and R$^5$ and R$^6$ are methyl or phenyl.

Particularly preferred compounds of the formula I are those in which n is 1, Ar is phenyl, chlorophenyl or C$_7$-C$_{10}$-alkylphenyl, R$^1$ and R$^2$ are methyl or together are pentamethylene and X is —OH, —OCH$_3$, —O—allyl or —OSi(CH$_3$)$_3$.

The amount of iodonium salts (component b) required for the process according to the invention is 0.1 to 10% by weight and preferably 0.1 to 3% by weight, based on component a.

The amount of co-catalyst of the formula I, II or III (component c) required for the process according to the invention is likewise 0.1 to 10% by weight and preferably 1 to 5% by weight, based on component a.

The photopolymerisable mixtures according to the invention can also contain further additives such as are known and customary in the technology of photocurable compositions. Examples of such additives are pigments, dyes, fillers and reinforcing materials, glass fibres and other fibres, flameproofing agents, antistatic agents or levelling assistants. Further examples are photosensitisers, which shift the spectral sensitivity of the photopolymerisable mixtures into specific ranges, for example perylene, derivatives of anthracene and of thioxanthone or organic dyes. Further examples of additives are heat stabilisers which increase the storage stability of the photopolymerisable mixtures, for example specific nitriles, amides or sulfoxides. Further examples are antioxidants and light stabilisers, which are intended to stabilise the cured compositions against ageing.

If short-wave light is excluded, the mixtures according to the invention can be stored at room temperature for a long time without undergoing change. Polymerisation of the mixture is effected by irradiation with short-wave light, for example by means of medium-pressure, high-pressure or low-pressure mercury vapour lamps or by means of superactinic fluorescent tubes, which have an emission spectrum in the range of 250–400 mμ. In the presence of suitable photosensitisers, curing in daylight is also possible. Such sensitisers are described, for example, in U.S. Pat. No. 3,729,313. It is not necessary to add any catalyst or other additive to the mixture according to the invention prior to polymerisation. The mixtures are therefore solvent-free one-component systems.

The process is suitable in particular for the curing of paints and coatings based on epoxide compounds. Such coatings can be applied to and cured on any desired material, for example metal, wood, paper, glass, ceramic compositions or plastics, and in most cases serve to protect or to decorate such articles.

The process is also suitable for the curing of printing inks, since the drying time of the binder plays a large role in the production speed of graphic products.

The process is also suitable for the production of laminates, mouldings and printing plates, for example those made of epoxide resins. In this case, the photopolymerisable compositions are in the main employed in combination with glass fibres or other fibres. Examples of such use are the production of sheets or tubes or the production of sports articles or parts for automobile bodywork. In the case of such relatively thick-walled laminates and mouldings, the superiority of the catalyst combination according to the invention over the known photopolymerisation with iodonium salts as the sole catalysts is particularly clearly evident.

Examples of mixtures according to the invention and their photopolymerisation are described in more detail in the examples which follow. In these examples parts and percentages are by weight.

EXAMPLE 1

20 g of an epoxide resin which is based on bisphenol A glycidyl ether and has an epoxide equivalent of 185–196 g/equivalent (Araldit GY 250, Ciba-Geigy AG) are mixed with the amounts of catalyst and co-catalyst indicated in Table 1 and the mixtures are stirred at 50°–60° C. until a clear solution has formed (about 10 minutes).

This solution is applied, with the aid of a doctor, in a layer thickness of 300 μm to glass plates 9×12 cm in size, and the samples thus obtained are irradiated in one pass in a PPG irradiation apparatus with 2 lamps each with a power of 80 watt/cm, at a transport speed of 10 m/minute. This corresponds to an irradiation time of 4.2 seconds.

After storing the samples for 10 minutes, the pendulum hardness of the films is measured by the König method (DIN 53,157). The individual measurements are repeated after 30 minutes, after 4 hours and after 24 hours.

The following catalysts and co-catalysts are used
Ca 1: diphenyliodonium hexafluorophosphate
Ca 2: diphenyliodonium hexafluoroarsenate
Co 1: 1-benzoylcyclohexanol
Co 2: 2-benzoyl-2-propanol
Co 3: 2-benzoyl-2-propanol trimethylsilyl ether
Co 4: benzoin isopropyl ether (comparison)
Co 5: benzophenone (comparison)

TABLE 1

| Catalyst | Co-catalyst | Pendulum hardness (in seconds) after a storage time of | | | |
|---|---|---|---|---|---|
| | | 10 minutes | 30 minutes | 4 hours | 24 hours |
| 2% Ca 1 | — | 40 | 52 | 60 | 75 |
| 5% Ca 1 | — | 49 | 57 | 69 | 97 |
| 2% Ca 1 | 3% Co 1 | 97 | 109 | 146 | 183 |
| 2% Ca 1 | 1% Co 2 | 73 | 86 | 99 | 127 |
| 2% Ca 1 | 3% Co 2 | 104 | 110 | 151 | 193 |
| 2% Ca 1 | 5% Co 2 | 162 | 164 | 176 | 203 |
| 2% Ca 1 | 3% Co 3 | 65 | 69 | 98 | 115 |
| 2% Ca 1 | 3% Co 4 | 25 | 28 | 39 | 46 |
| 2% Ca 1 | 3% Co 5 | 14 | 20 | 26 | 31 |
| 2% Ca 2 | — | 50 | 58 | 67 | 82 |
| 2% Ca 2 | 3% Co 1 | 129 | 140 | 179 | 214 |
| 2% Ca 2 | 3% Co 2 | 135 | 150 | 190 | 212 |

If a photosensitiser is additionally added under the same conditions, a further acceleration of the photopolymerisation can occur.

The following sensitisers are used.
S 1: 9,10-diethoxyanthracene
S 2: perylene.

The results are summarised in Table 2.

TABLE 2

| Catalyst | Co-catalyst | Sensitiser | Pendulum hardness (seconds) after | | |
|---|---|---|---|---|---|
| | | | 10 minutes | 4 hours | 24 hours |
| 2% Ca 1 | 3% Co 2 | — | 104 | 151 | 193 |
| 2% Ca 1 | 3% Co 2 | 0.5% S 1 | 109 | 176 | 206 |
| 2% Ca 1 | 3% Co 2 | 0.5% S 2 | 110 | 182 | 220 |

EXAMPLE 2

The procedure of Example 1 is repeated, except that a cycloaliphatic epoxide resin with 7.0–7.5 epoxide equivalents/kg (Araldit CY 179, Ciba-Geigy AG), which is of low viscosity, is used as the polymerisable substrate. Table 3 shows the pendulum hardness of the films cured in this way.

TABLE 3

| Catalyst | Co-catalyst | Pendulum hardness (seconds) after a storage time of | | |
|---|---|---|---|---|
| | | 30 minutes | 4 hours | 24 hours |
| 2% Ca 1 | — | 8 | 11 | 12 |
| 5% Ca 1 | — | 10 | 11 | 10 |
| 2% Ca 1 | 3% Co 1 | 11 | 51 | 62 |
| 2% Ca 1 | 3% Co 2 | 16 | 59 | 67 |

EXAMPLE 3

The following compounds were mixed together:
56 parts of an epoxide resin based on bisphenol A glycidyl ether having an epoxide equivalent of 185–196 g/equivalent (Araldit GY 250, Ciba-Geigy AG)
40 parts of an epoxidised soybean oil containing 6–6.3 percent of epoxide oxygen (Rheoplast 39, Ciba-Geigy AG)
3 parts 1-benzoylcyclohexanol
1 part diphenyliodonium hexafluorophosphate The liquid mixture is applied onto glass plates in a coating thickness of 120 mμ. The samples are irradiated in one pass in a QC-processor with 2 lamps each having a power of 80 watt/cm, at a transport speed of 7.5 m/min. The pendulum hardness (DIN 53157) of the coating film after 30 min. storage is 20 sec. and after 24 hours storage 70 sec.

The same coating mixture is applied to aluminum sheets in a thickness of 40 μm and irradiated in the same way as the glass plates. The following characteristics of the coating film are determined:

|  | after 30 min | after 24 hours |
|---|---|---|
| Cross-cut tape test (acc. to ASTM D-3359/78) | 1 (excellent) | 1 (excellent) |
| Gardner reverse impact test | >160 | >160 |
| Acetone resistance | excellent | excellent |

The same mixture is applied to aluminum foil in a thickness of about 8 um. The samples are irradiated in one pass at a speed of 48 m/min. The coating films show excellent adhesion and flexibility. In the cross-cut tape test the notation is 1.

What is claimed is:

1. A photopolymerizable mixture consisting essentially of
   (a) an epoxide compound or a mixture of epoxide compounds, said epoxide compound containing no ethylenically unsaturated group,
   (b) an aromatic iodonium salt as the polymerization catalyst, and
   (c) an aromatic carbonyl compound as the cocatalyst which is a ketone of formula I

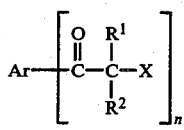

in which n is a 1 or 2 and Ar, if n is 1, is phenyl, diphenyl, tetrahydronaphthyl or phenyl which is substituted by one or more of the radicals F, Cl, Br, $C_1$-$C_{12}$-alkyl, —O—phenyl or —OAlk and, if n is 2, is $C_6$-$C_{12}$-arylene or a -phenylene-T-phenylene group in which T is —O—, —S— or —$CH_2$—, and Alk is $C_1$-$C_4$-alkyl, X is OH, $R^1$ is $C_1$-$C_8$-alkyl or —$CH_2CH_2COOAlk$ and $R^2$ is $C_1$-$C_8$-alkyl or allyl, or $R^1$ and $R^2$ together are $C_4$-$C_7$-alkylene.

2. A photopolymerisable mixture according to claim 1, wherein component (a) is a mixture of a polyglycidylether type epoxide resin with an epoxidised soybean oil.

3. A photopolymerisable mixture according to claim 1, wherein component (b) is an aromatic iodonium salt of the formula IV

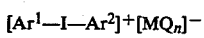

in which $Ar^1$ and $Ar^2$ independently of one another are phenyl, naphthyl or phenyl which is substituted by one or more of the radicals $C_1$-$C_8$-alkyl, phenyl, phenoxy, halogen, nitro or $C_1$-$C_4$-alkoxy, or $Ar^1$ and $Ar^2$ together are a divalent radical of the formula V

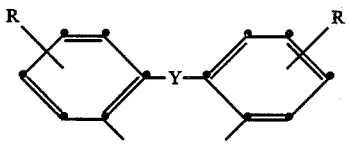

in which Y is a direct bond, —O—, —$CH_2$— or —CO— and R is $C_1$-$C_4$-alkyl, halogen, nitro or $C_1$-$C_4$-alkoxy, M is a metal atom or metalloid atom from the series comprising B, P, As, Sb, Sn, Bi and Fe, Q is fluorine or chlorine and n is 4, 5 or 6 and 1 larger than the valency of M.

4. A photopolymerisable mixture according to claim 2, wherein component (b) is a diphenyliodonium salt.

5. A photopolymerisable mixture according to claim 2, wherein the anion $[MQ_n]^-$ of the iodonium salt is one of the anions $BF_4^-$, $PF_6^-$, $AsF_6^-$ or $SbF_6^-$.

6. A photopolymerisable mixture according to claim 1, wherein component (c) is a compound of the formula I, in which n is 1, Ar is phenyl, chlorophenyl or $C_7$-$C_{10}$-alkylphenyl, $R^1$ and $R^2$ are either both methyl or together are pentamethylene and X is —OH.

7. A photopolymerisable mixture according to claim 1, wherein the mixture contains a photosensitiser.

8. A process for the photochemical polymerization of cationically polymerizable compounds or mixtures of compounds which comprises
   exposing a mixture of
   (a) an epoxide compound or a mixture of epoxide compounds, said epoxide compound containing no ethylenically unsaturated group,
   (b) an aromatic iodonium salt as the polymerization catalyst, and
   (c) an aromatic carbonyl compound as the cocatalyst which is a ketone of formula I

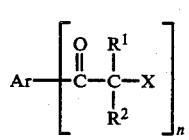

in which n is a 1 or 2 and Ar, if n is 1, is phenyl, diphenyl, tetrahydronaphthyl or phenyl which is substituted by one or more of the radicals F, Cl, Br, $C_1$-$C_{12}$-alkyl, —O—phenyl or —OAlk and, if n is 2, is $C_6$-$C_{12}$-arylene or a -phenylene-T-phenylene group in which T is —O—, —S— or —$CH_2$—, and Alk is $C_1$-$C_4$-alkyl, X is OH, $R^1$ is $C_1$-$C_8$-alkyl or —$CH_2CH_2COOAlk$ and $R^2$ is $C_1$-$C_8$-alkyl or allyl, or $R^1$ and $R^2$ together are $C_4$-$C_7$-alkylene, to irradiation by short-wave light.

9. A process according to claim 8, wherein an aromatic iodonium salt of the formula IV

in which $Ar^1$ and $Ar^2$ independently of one another are phenyl, naphthyl or phenyl which is substituted by one or more of the radicals $C_1$-$C_8$-alkyl, phenyl, phenoxy, halogen, nitro or $C_1$-$C_4$-alkoxy, or $Ar^1$ and $Ar^2$ together are a divalent radical of the formula V

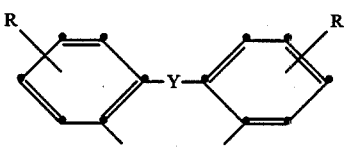

in which Y is a direct bond, —O—, —$CH_2$— or —CO— and R is $C_1$-$C_4$-alkyl, halogen, nitro or $C_1$-$C_4$-alkoxy, M is a metal atom or metalloid atom from the series comprising B, P, As, Sb, Sn, Bi and Fe, Q is fluorine or chlorine and n is 4, 5 or 6 and 1 larger than the valency of M, is used as component (b).

* * * * *

UNITED STATES PATENT AND TRADEMARK OFFICE
CERTIFICATE OF CORRECTION

PATENT NO. : 4,560,709
DATED : DECEMBER 24, 1985
INVENTOR(S) : GODWIN BERNER, RUDOLF KIRCHMAYR

It is certified that error appears in the above—identified patent and that said Letters Patent is hereby corrected as shown below:

On the cover page, Item [63], second line, should read -- which is a continuation of Ser. No. 261,434, --.

Signed and Sealed this

Sixteenth Day of February, 1988

Attest:

DONALD J. QUIGG

*Attesting Officer*    *Commissioner of Patents and Trademarks*